UNITED STATES PATENT OFFICE.

WILLIAM H. ROSS, OF WASHINGTON, DISTRICT OF COLUMBIA, ASSIGNOR OF ONE-HALF TO WILLIAM LLOYD EVANS, OF COLUMBUS, OHIO.

PROCESS OF PREPARING ETHYLENE AND OTHER UNSATURATED HYDROCARBONS.

1,392,852.  Specification of Letters Patent.  Patented Oct. 4, 1921.

No Drawing.  Application filed June 1, 1920.  Serial No. 385,799.

(FILED UNDER THE ACT OF MARCH 3, 1883, 22 STAT. L., 625.)

*To all whom it may concern:*

Be it known that I, WILLIAM H. ROSS, a citizen of the United States of America, and resident of Washington, in the District of Columbia, have invented a new and useful Process of Preparing Ethylene and other Unsaturated Hydrocarbons, of which the following is a specification.

This application is made under the act of March 3, 1883, chapter 143 (22 Stat., 625) and the invention herein described and claimed may be used by the Government of the United States or any of its officers or employees in the prosecution of work for the Government, and any person in the United States without the payment to me of any royalty thereon.

This invention relates to the production of unsaturated hydrocarbons from less saturated hydrocarbons by passing mixtures of the latter gases with hydrogen over an active metallic catalyst.

Among the objects of this invention is the production of the unsaturated hydrocarbon in an efficient and cheap manner; to recover the gas in a pure state or with only traces of other impurities; and to perform the process continuously.

In their general investigation of the hydrogenation of organic compounds by catalysis, Sabatier and Senderens (*Compt. rend.*, 128, 1173, 1899) observed that when mixtures of hydrogen and acetylene were passed over reduced nickel, some ethylene was obtained, but this gas had almost always associated with it large quantities of ethane together with one or both of the constituents of the original mixture.

I have found that by placing a finely divided metallic catalyst, such as nickel, in a tube and passing hydrogen or hydrocarbon, such as acetylene, through the tube, the catalyst will adsorb relatively large quantities of the gases, and these gases will be retained on the surface of the finely divided metal after the free gas has been pumped out.

The activity of reduced nickel varies greatly with its purity and the condition of preparation and the activity is closely related to the adsorbing power of nickel. The mechanism of the catalytic action of reduced nickel and other metals is dependent on their physical rather than on their chemical properties and is due to a very intimate concentration of the reacting gases by adsorption on the surface of the metal. The adsorption increases, and likewise the activity of the catalyst, as the surface of the metal is increased by porosity or fineness of the particles.

I have found when passing a mixture of equal parts of hydrogen and acetylene over a freshly prepared catalyst of high activity that the quantity of hydrogen adsorbed together with that added was sufficient to change a quantity of acetylene into ethane with little or no formation of ethylene. The adsorbed hydrogen may also bring about the hydrogenation of a considerable amount of acetylene when this alone is passed over the catalyst, and it is due to the presence of the hydrogen alone that the apparent action of active nickel on acetylene at normal temperature may be attributed. The presence of the acetylene causes the hydrogen on the nickel to be used up, however, and the proportion of acetylene undergoing hydrogenation decreases with the time it is allowed to stand over the catalyst. By thus treating a sample of reduced nickel until the adsorbed hydrogen is entirely eliminated, I have found that a new supply of acetylene could then be left in contact with it indefinitely at ordinary temperature without undergoing any decomposition whatever.

When mixtures of equal parts of hydrogen and acetylene are now passed over a catalyst that has been treated in the way described, the reaction no longer proceeds to the formation of ethane, but both gases combine to yield a product consisting almost entirely of ethylene. By proper regulation of the gaseous mixture a product can be recovered containing less than 4% hydrogen and ethane combined. Best results are obtained when hydrogen is taken in slight excess, but a further increase in hydrogen results in an increase of ethane in the recovered gas. By using an excess of acetylene in the mixture, the hydrogen and ethane in the gaseous product are decreased but the acetylene is increased.

Since the activity of a catalyst used in the hydrogenation is dependent on the quantity of hydrogen that it is capable of adsorbing, it follows that any treatment that increases the porosity or surface area of a catalyst will bring about, when other conditions are the same, a corresponding increase in the activity of the metal, and in the speed with which it acts in any hydrogenation reaction. If a sample of nickel is very pure, or if it contains impurities which increases fusibility, sintering to a greater or less degree with corresponding decrease in adsorbing power will occur during the process of reduction. I have found that when the metal contains some impurity, such as silicious matter, a compound of an alkaline earth element, as barium, or other material, which has the effect of decreasing its fusibility, the tendency toward sintering during reduction may be entirely avoided and the activity of the catalyst thereby greatly increased.

The nickel catalyst may be prepared by placing pure nickel nitrate, or preferably a nitrate of nickel containing a compound of an alkaline earth metal or other impurity which has the effect of decreasing the fusibility of nickel, in a suitable container and heating until it melts in its water of crystallization. Screened pumice of 20 mesh or larger is then added with stirring until all liquid disappears by adsorption into the pores of the pumice. The temperature is then raised slowly and continued at a point a little below redness until all nitrogen dioxid fumes are driven off. The material is then transferred to a catalyzer chamber provided with suitable heating elements whereby the temperature may be raised to about 300° C. Owing to the granular nature of the material on which the nickel is deposited, the chamber may be completely filled with the catalyst, if desired.

The hydrogenation process is then begun by passing hydrogen through the chamber until reduction of the catalyst is complete, or until there is no further escape of moisture from the catalyzer chamber. At the end of the reduction, the chamber is allowed to cool and the unadsorbed hydrogen which it contains is then pumped out. Acetylene is now added and allowed to remain until there is no further reaction between the gas and the hydrogen adsorbed in the nickel. The chamber is then exhausted, whereby the ethane formed in the reaction is removed, and acetylene again added as before. The operation is repeated until all adsorbed hydrogen has been eliminated from the catalyst. When this stage is reached no further decomposition of the acetylene will occur and the pressure within the chamber will remain unchanged. The elimination of the adsorbed hydrogen through the action of acetylene may be hastened by raising the temperature somewhat, but ordinarily this should not be allowed to exceed 150° C. When a mixture of approximately equal parts by volume of hydrogen and acetylene is now passed through the catalyst at a temperature below 150° C., and at a rate depending on the activity of the catalyst, a gaseous product may be recovered containing from 80–90% of ethylene.

While I have herein referred specifically to the use of nickel as a catalyst in this invention, it is to be understood that other metals, such as copper, iron, cobalt, etc., might be used and that these may be deposited on other materials than pumice or otherwise prepared without departing from the spirit and scope of this invention. Furthermore, it is to be understood that other unsaturated hydrocarbons of the acetylene series may be used and that other members of the ethylene series of hydrocarbons may be prepared by this manner instead of ethylene.

The foregoing examples should be construed as illustrative and not by way of limitation and in view of the numerous modifications which may be effected therein without departing from the spirit and scope of this invention, it is desired that only such limitations be imposed as are indicated in the appended claims.

I claim:

1. In a process of making unsaturated hydrocarbons, treating a metallic catalyst with hydrogen, then with a less saturated hydrocarbon than that which it is desired to produce and conducting a mixture of hydrogen and the less saturated hydrocarbon in contact with the treated catalyst.

2. In a process of making unsaturated hydrocarbons, treating a nickel catalyst with hydrogen, then with a less saturated hydrocarbon than that which it is desired to produce and conducting a mixture of hydrogen and the less saturated hydrocarbon in contact with the treated catalyst.

3. In a process of making unsaturated hydrocarbons, effecting complete adsorption of hydrogen by a metallic catalyst, removing excess unadsorbed hydrogen from said catalyst, bringing a less saturated hydrocarbon than that which it is desired to produce in contact with the treated catalyst until adsorption of the less saturated hydrocarbon is complete and then conducting a mixture of hydrogen and the less saturated hydrocarbon in contact with the prepared catalyst.

4. In a process of making unsaturated hydrocarbons, effecting complete adsorption of hydrogen by a nickel catalyst, removing excess unadsorbed hydrogen from said catalyst, bringing a less saturated hydrocarbon than that which it is desired to produce in contact with the treated catalyst until adsorption of the less saturated hydrocarbon is complete and then conducting a mixture of hydrogen and the less saturated hydrocarbon in contact with the prepared catalyst.

5. In a process of preparing olefin, treating a nickel catalyst with hydrogen, then with hydrocarbon of acetylene series and conducting a mixture of hydrogen and hydrocarbon of acetylene series in contact with the prepared catalyst.

6. In a process of preparing olefin, effecting complete adsorption of hydrogen by a metallic catalyst, removing excess unadsorbed hydrogen from said catalyst, bringing hydrocarbon of acetylene series in contact with the treated catalyst until adsorption of said hydrocarbon is complete and then conducting a mixture of hydrogen and hydrocarbon of acetylene series in contact with the prepared catalyst.

7. In a process of preparing olefin, effecting complete adsorption of hydrogen by a nickel catalyst, removing excess unadsorbed hydrogen from said catalyst, bringing hydrocarbon of acetylene series in contact with the treated catalyst until adsorption of said hydrocarbon is complete and then conducting a mixture of hydrogen and hydrocarbon of acetylene series in contact with the prepared catalyst.

8. In a process of making ethylene, treating a metallic catalyst with hydrogen, then with acetylene and conducting a mixture of hydrogen and acetylene in contact with the prepared catalyst.

9. In a process of making ethylene, treating a nickel catalyst with hydrogen, then with acetylene and conducting a mixture of equal volumes of hydrogen and acetylene in contact with the prepared catalyst.

10. In a process of making ethylene, treating a nickel catalyst with hydrogen, then with acetylene, and conducting a mixture of equal volumes of hydrogen and acetylene in contact with the prepared catalyst at a temperature below 150° C.

11. In a process of making ethylene, effecting complete adsorption of hydrogen by a nickel catalyst, removing excess unadsorbed hydrogen from said catalyst, bringing acetylene in contact with the treated catalyst until adsorption of acetylene is complete and then conducting a mixture of hydrogen and acetylene in contact with the prepared catalyst.

12. In a continuous process of preparing olefin, treating a metallic catalyst with hydrogen, then with hydrocarbon of acetylene series and continuously passing a mixture of hydrogen and hydrocarbon of acetylene series in contact with the prepared catalyst.

13. In a continuous process of making ethylene, treating a nickel catalyst with hydrogen, then with acetylene and continuously passing a mixture of hydrogen and acetylene in contact with the prepared catalyst.

14. In a continuous process of making ethylene, effecting complete adsorption of hydrogen by a metallic catalyst, removing excess unadsorbed hydrogen from said catalyst, bringing acetylene in contact with the treated catalyst until adsorption of the acetylene is complete and then continuously passing a mixture of hydrogen and acetylene in contact with the prepared catalyst.

WILLIAM H. ROSS.